United States Patent
Tofighbakhsh

(10) Patent No.: US 8,159,944 B2
(45) Date of Patent: Apr. 17, 2012

(54) TIME BASED QUEUING

(75) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 154 days.

(21) Appl. No.: 12/343,884

(22) Filed: Dec. 24, 2008

(65) Prior Publication Data
US 2010/0157798 A1   Jun. 24, 2010

(51) Int. Cl.
*H04L 12/26* (2006.01)
(52) U.S. Cl. ......... 370/231; 370/236; 370/412; 370/429
(58) Field of Classification Search .................. 370/231, 370/236, 252, 412, 428, 429
See application file for complete search history.

(56) References Cited

U.S. PATENT DOCUMENTS

| | | | |
|---|---|---|---|
| 6,259,699 B1 | 7/2001 | Opalka et al. | |
| 6,760,309 B1 * | 7/2004 | Rochberger et al. | 370/235 |
| 6,781,994 B1 | 8/2004 | Nogami et al. | |
| 7,263,371 B2 | 8/2007 | Das et al. | |
| 7,310,678 B2 * | 12/2007 | Gunaseelan et al. | 709/230 |
| 7,343,424 B2 | 3/2008 | Amato | |
| 7,366,092 B2 | 4/2008 | Moll et al. | |
| 2005/0063701 A1 | 3/2005 | Ovadia et al. | |
| 2006/0056365 A1 | 3/2006 | Das et al. | |
| 2006/0058038 A1 | 3/2006 | Das et al. | |
| 2006/0058056 A1 | 3/2006 | Das et al. | |
| 2006/0268713 A1 * | 11/2006 | Lundstrom | 370/235 |
| 2007/0121596 A1 | 5/2007 | Kurapati et al. | |
| 2007/0189187 A1 * | 8/2007 | Ryu et al. | 370/252 |
| 2007/0191054 A1 | 8/2007 | Das et al. | |
| 2007/0207811 A1 | 9/2007 | Das et al. | |
| 2008/0049620 A1 | 2/2008 | Riga et al. | |
| 2008/0080475 A1 | 4/2008 | Orth et al. | |
| 2010/0008376 A1 * | 1/2010 | Bandholz et al. | 370/412 |
| 2010/0034170 A1 * | 2/2010 | Hirano et al. | 370/331 |

FOREIGN PATENT DOCUMENTS

| | | |
|---|---|---|
| EP | 1 050 181 | 11/2007 |
| WO | WO 9935577 | 7/1999 |
| WO | WO 04001621 | 12/2003 |
| WO | WO 2005029881 | 3/2005 |

* cited by examiner

*Primary Examiner* — Luat Phung

(57) ABSTRACT

Smart routing packet handling across multiple networks achieves end-to-end (ETE) quality of service (QOS) when complementing or replacing conventional priority-based scheduling algorithms. Packets are "tagged" with a time code that indicates a time is allotted for the packet to transmit from a source to a destination and/or a measure of transmission time. Buffers at routers and/or switches utilize this information to order a transmission queue. In this way, queues may be intelligently scheduled to achieve a maximum ETE QOS.

12 Claims, 3 Drawing Sheets

TIME BASED QUEUING

BACKGROUND OF THE INVENTION

The present invention relates generally to quality of service in packet transfer and more particularly to improving end-to-end quality of service in multi-domain environments.

Quality of service (QOS) is the ability to provide different priority to different applications, users, or data flows, or to guarantee a certain level of performance to a data flow. For example, a required bit rate, delay, jitter, packet dropping probability, and/or bit error rate may be guaranteed. Quality of service guarantees are important if the network capacity is insufficient, especially for real-time streaming multimedia applications such as voice over IP (VOIP), online games, and IP-TV, since these often require fixed bit rate and are delay sensitive, and in networks where the capacity is a limited resource, such as cellular data communication.

A network or protocol that supports QOS may agree on a traffic contract with the application software and reserve capacity in the network nodes, such as during a session establishment phase. During the session it may monitor the achieved level of performance, for example the data rate and delay, and dynamically control scheduling priorities in the network nodes. It may release the reserved capacity during a tear down phase.

In the field of telephony, QOS is defined in the ITU standard X.902 as "A set of quality requirements on the collective behavior of one or more objects." QOS includes requirements on all the aspects of a connection, such as service response time, loss, signal-to-noise ratio, cross-talk, echo, interrupts, frequency response, loudness levels, and the like.

Quality of service is affected by various factors, including stability of service, availability of service, delays, user information, reliability, scalability, effectiveness, maintainability, Grade of Service, etc. Various mechanisms have been developed to provide a predetermined QOS in packet networks.

Currently, "DiffServ" or differentiated services models are used. In the DiffServ model, packets are marked according to the type of service they need. In response to these markings, routers and switches use various queuing strategies to tailor performance to requirements. At the IP layer, differentiated services code point (DSCP) markings use the 6 bits in the IP packet header. At the MAC layer, VLAN IEEE 802.1Q and IEEE 802.1D can be used to carry essentially the same information.

Routers supporting DiffServ use multiple queues for packets awaiting transmission from bandwidth constrained (e.g., wide area) interfaces. Router vendors provide different capabilities for configuring this behavior, to include the number of queues supported, the relative priorities of queues, and bandwidth reserved for each queue.

In practice, when a packet must be forwarded from an interface with queuing, packets requiring low jitter (e.g., VOIP, video teleconferencing, etc.) are given priority over packets in other queues. Typically, some bandwidth is allocated by default to network control packets (e.g., Internet control message protocols and routing protocols), while best effort traffic might simply be given whatever bandwidth is left over.

Additional bandwidth management mechanisms may be used to further engineer performance. Examples of such mechanisms include rate limiting, such as token bucket algorithms, leaky bucket algorithms, and transmission control protocol (TCP) rate control (e.g., artificially adjusting TCP window size as well as controlling the rate of acknowledgments (ACKs) being returned to the sender. Scheduling algorithms, such as weighted fair queuing (WFQ), class based weighted fair queuing, weighted round robin (WRR), deficit weighted round robin (DWRR), hierarchical Fair Service Curve (HFSC), may also be used. These current methods do not achieve sufficient end-to-end (ETE) QOS in complex multi-domain environments.

Accordingly, improved systems and methods for end-to-end quality of service in multi-domain environments are required.

BRIEF SUMMARY OF THE INVENTION

The present invention generally provides methods for routing a packet in a network. The packet and an associated time code (e.g., a tag) are received at a first destination and the packet and the associated time code are forwarded to a second destination. The packet is added to a buffer of the first destination and the destination's router extracts the packet from the buffer based at least in part on the associated time code. A time until delivery is determined based at least in part on the associated time code where forwarding the packet and the associated time code to a second destination includes forwarding the packet and the associated time code to a second destination based on the determined time until delivery.

In an embodiment, the elapsed time since the packet was initially sent from the source and a difference between the elapsed time since the packet was initially sent from the source and a time at which the packet is expected to be received at a final destination are determined. A time the packet was initially sent from the source and a current time are determined. The difference between the elapsed time since the packet was initially sent from the source and the time at which the packet is expected to be received at the final destination is determined based at least in part on the determined current time and the determined time the packet was initially sent from the source.

In another embodiment, it is determined if the first destination is a final destination. If the first destination is not the final destination, the packet and the associated time code are forwarded to a second destination.

These and other advantages of the invention will be apparent to those of ordinary skill in the art by reference to the following detailed description and the accompanying drawings.

DETAILED DESCRIPTION

The present "smart routing" approach to packet handling across multiple networks achieves end-to-end (ETE) quality of service (QOS) when complementing or replacing conventional priority-based scheduling algorithms. Generally, packets are "tagged" with a time code that indicates a time is allotted for the packet to transmit from a source to a destination and/or a measure of transmission time. Buffers at routers and/or switches utilize this information to order a transmission queue. In this way, queues may be intelligently scheduled to achieve a maximum ETE QOS.

Figure 1:
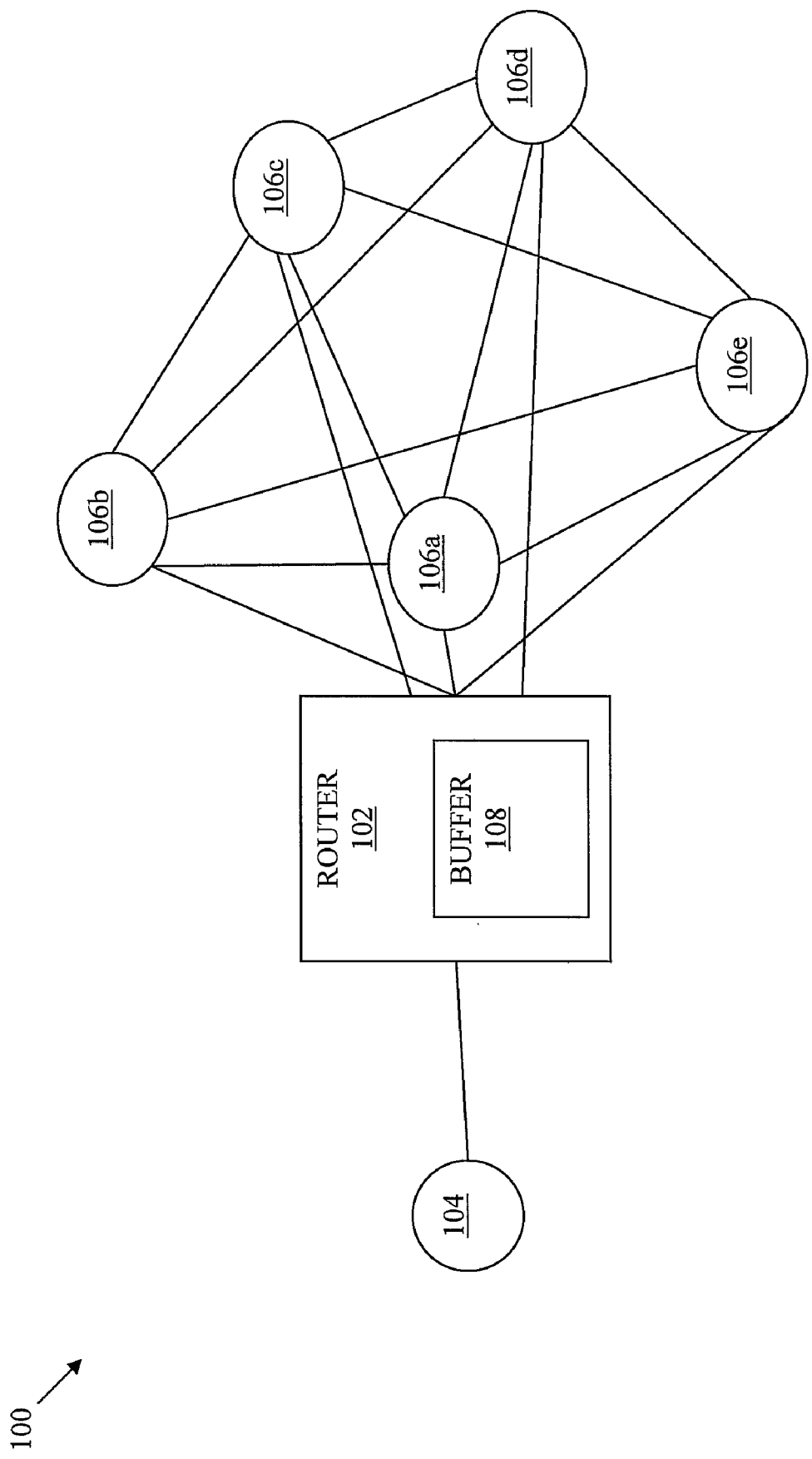
FIG. 1 depicts a packet switched network according to an embodiment of the present invention.

FIG. 1 depicts a packet switched network 100 according to an embodiment of the present invention. Network 100 is depicted very generally for simplicity of presentation of the features of the present invention disclosed herein. Though shown as a simple network, one of skill in the art will recognize that the network 100 may be of any appropriate size and/or may include multiple networks and/or components. For clarity of presentation, certain components are drawn separately. However, in practical application, may be combined or otherwise attached and/or be in communication with other portions of network 100 as discussed below.

Network 100 includes a router 102 in communication with a source 104 and one or more destinations 106*a-e*. Router 102 may include one or more buffers 108. Though router 102 is depicted as a separate entity from both source 104 and destinations 106*a-e*, each of both source 104 and destinations 106*a-e* may include a router 102 and/or buffer 108.

Router 102 is a networking device with software and hardware tailored to performing the tasks of routing and forwarding information. In at least one embodiment, router 102 may be a switch in a network. That is, though referred to herein as a router, router 102 may be a computer networking device that connects network segments as is known.

Source 104 and destinations 106*a-e* are nodes in a network. In at least one embodiment, source 104 and/or destinations 106*a-e* are active electronic devices that are attached to a network and are capable of sending, receiving, and/or forwarding information over a communications channel. As mentioned above, source 104 and destinations 106*a-e* may each be or include one or more routers 102 and one or more buffers 108. Though shown in FIG. 1 as a single source 102 and five destinations 106*a-e*, any number of sources 102 and/or destinations 106 may be included in network 100 or a related or overlapping network.

Buffer 108 is a region of memory, routine, storage medium, or the like used in a node (e.g., in router 102, source 104, and/or destinations 106*a-e*) to compensate for a difference in rate of flow of data, or time of occurrence of events, when transferring data from one node to another. Buffer 108 is a "smart" buffer that can measure a time limitation of a packet or other information related to a time code as is discussed in further detail below with respect to FIG. 3.

Figure 2:
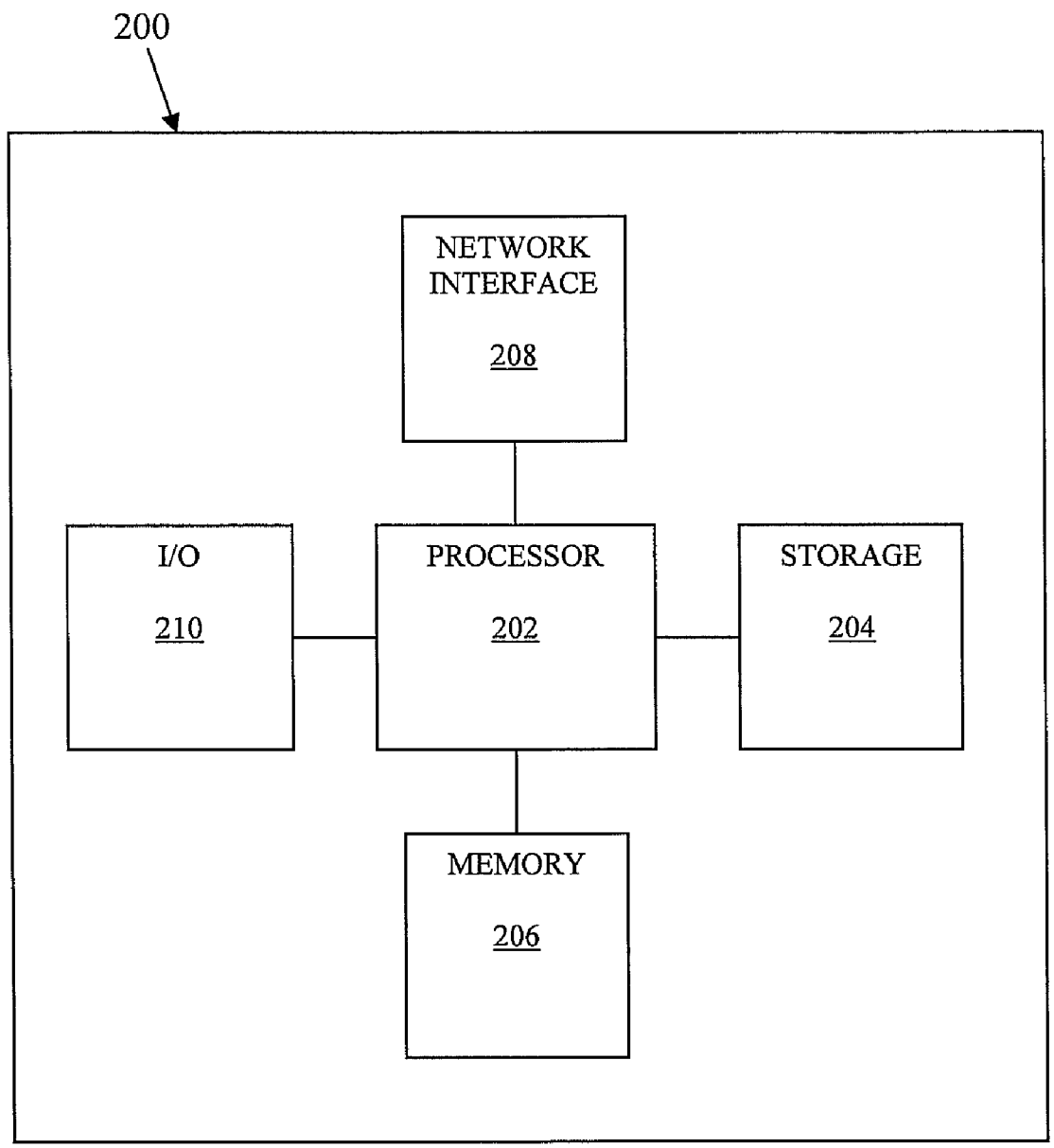
FIG. 2 is a diagram of a controller.

FIG. 2 is a schematic drawing of a controller 200 according to an embodiment of the present invention. Controller 200 may be used as a router 102 of FIG. 1 and/or as a source 104 and/or destination 106*a-e*.

Controller 200 contains devices that form a controller including a processor 202 that controls the overall operation of the controller 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to method 300 are defined by the computer program instructions stored in the memory 206 and/or storage 204 and controlled by the processor 202 executing the computer program instructions. The controller 200 may also include one or more network interfaces 208 for communicating with other devices via a network (e.g., packet switched network 100). The controller 200 also includes input/output devices 210 that enable operator interaction with the controller 200. Controller 200 and/or processor 202 may include one or more central processing units, read only memory (ROM) devices and/or random access memory (RAM) devices. One skilled in the art will recognize that an implementation of an actual computer for use in a portable communication device could contain other components as well, and that the controller of FIG. 2 is a high level representation of some of the components of such a portable communication device for illustrative purposes.

According to some embodiments of the present invention, instructions of a program (e.g., controller software) may be read into memory 206, such as from a ROM device to a RAM device or from a LAN adapter to a RAM device. Execution of sequences of the instructions in the program may cause the controller 200 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 206 may store the software for the controller 200, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Controller 200 may include a buffer, such as buffer 108 of FIG. 1. In such embodiments, the buffer may be a separate component of controller 200 or may be implemented using the components described above, such as storage 204 and/or memory 206.

Figure 3:
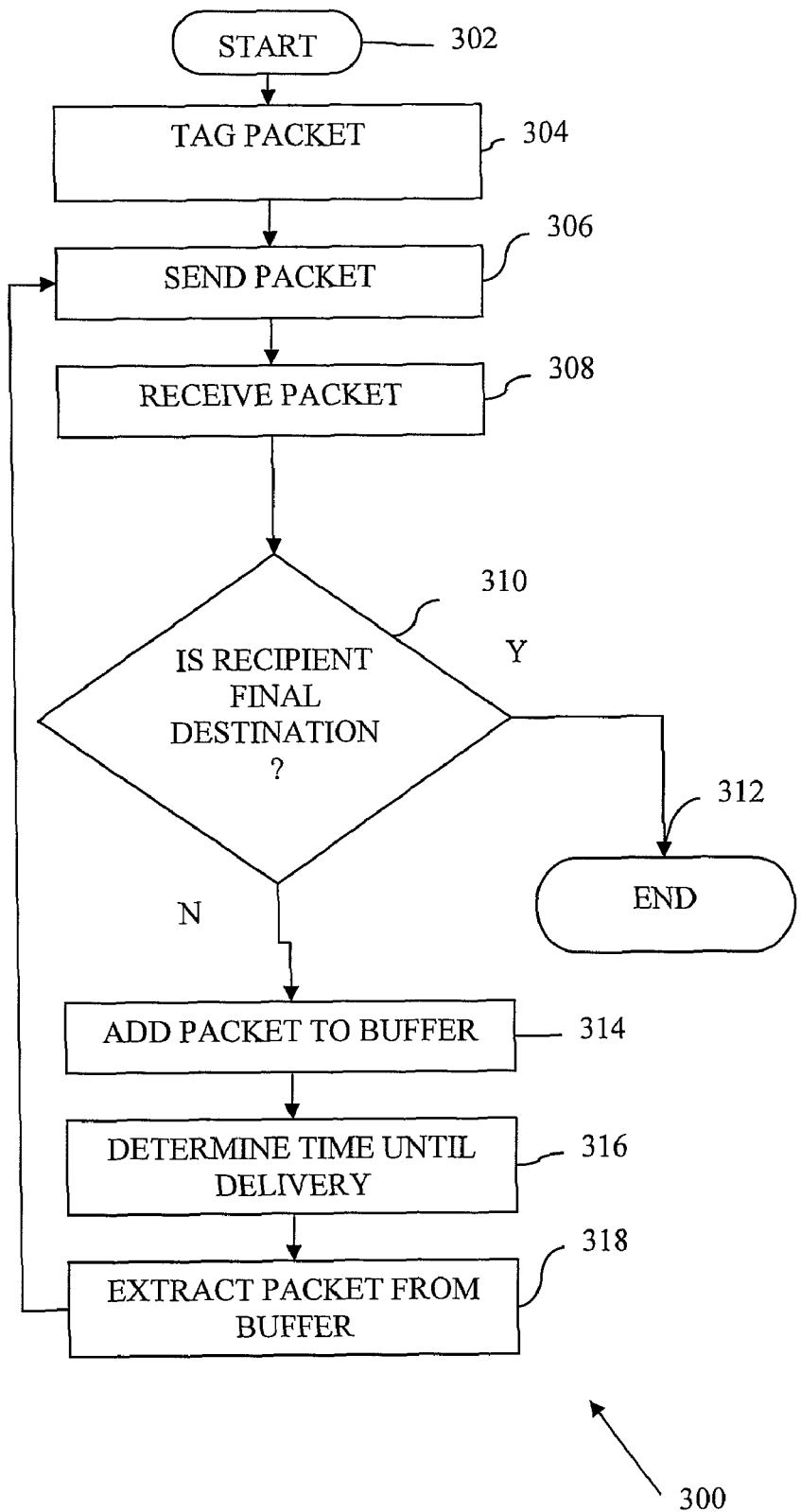
FIG. 3 is a flowchart of a method of time based queuing according to an embodiment of the present invention.

FIG. 3 is a diagram of a flowchart of a method 300 of time based queuing according to an embodiment of the present invention. The method 300 may be implemented by one or more components of network 100, especially a router 102 (and/or a router 102 implemented in source 104 and/or destinations 106*a-e*). The method begins at step 302.

In step 304, a packet is tagged. A time code is added to (e.g., associated with) the packet at source 104. The time code may include a time to be sent and/or a time sent. Additionally and/or alternatively, the time code may include a delivery time. The delivery time is an amount of time (or calculation of a final time based on the amount of time) until the packet should arrive at its intended recipient. For example, a typical voice packet may take within 100 milliseconds to arrive at a final destination. The delivery time is therefore either the 100 milliseconds time (e.g., an amount of time from the sending time until the packet should be received) or the 100 milliseconds time plus the sending time (e.g., a clock-based time). In another example, an email message may take multiple minutes to arrive a final destination. Of course, other packets, messages, or the like that can be transmitted over network 100 may have varying delivery times. Each packet is treated according to the QOS policies of the source 104.

In step 306, the packet is sent by source 104 to router 102. Since the time code tagged to the packet in step 304 may be a time sent, it may be understood that step 306 and 304 may be performed substantially simultaneously.

In step 308, the packet is received at router 102. For illustrative purposes, the packet is described as being received at a "standalone" router 102, though router 102 may be a component of a destination 106. The packet is received from source 104 some time after an initial "send time"

The packet may be received at a first router 102 or destination 106 in accordance with a "hop by hop" forwarding scheme. With hop-by-hop forwarding, packets are forwarded from node to node (e.g., from one destination 106 to another destination 106) in a store-and-forward manner—information (e.g., packets) is sent to an intermediate destination where it is kept and sent at a later time to the final destination or to another intermediate destination. For example, the final destination may be destination 106b, but a packet may be routed hop by hop from source 104 to router 102 to destination 106a to destination 106d to destination 106b.

As hop by hop forwarding involves not only the source and destination node, but rather some or all of the intermediate nodes as well, it allows data to be forwarded even if the path between source and destination is not permanently connected during communication.

In step 310, a check is performed to determine if the recipient is the final destination. That is, the router 102 or destination 106 uses packet information to determine if it is the intended final recipient. If the packet recipient is the final recipient, the method ends at step 312.

If the packet recipient is not the final destination, the packet is added to a buffer 108 in step 314. As discussed above, buffer 108 is a smart buffer and the time code is read to determine a time until delivery in step 316. The time until delivery may be a calculation, reading, or other determination based on the tagged time code. The initial time sent, the delivery time, and the current time may be used in this determination. For example, the time until delivery may be the amount of time left until the packet is expected to be received at its final destination. This time until delivery may be calculated by determining from the tagged time code the time the packet was initially sent from source 104 and comparing this time with the elapsed time and the expected sending duration. Of course, other calculations may be made to determine when the packet should arrive at its final destination and/or be forwarded to another destination.

Based on the time until final delivery determined in step 316, the router 102 extracts the packet from the buffer 108 in step 318. The method returns control to step 306 and the packet is forwarded based on the time code and the time until delivery. As discussed above, the packet may be sent to another intermediate destination 106. In the example above, the packet may be forwarded from router 102 to destination 106a in the next hop. Destination 106a receives the packet, determines if it is the final recipient, and if it is not, adds the packet to its buffer. The router of destination 106a then extracts the packet at an appropriate time based on the time until delivery and the message is again forwarded.

The method 300 of hop by hop forwarding manages not only the delay within the buffers 108, but will also impact the total bandwidth associated with each packet flow. Overall network capacity is increased when the routers and switches in a network use the time-sensitive method 300.

Time codes and calculations of delivery times, time sent, current times, and the like are discussed above generally in a manner consistent with a clock-based system. That is, a clock or other counter measures the time and calculations of time until delivery and the like are based on the clock. Of course, the time codes and calculations of delivery times, time sent, current times, and the like may be based on a relative system. That is, a packet may have a counter associated with it that is started at a predetermined start time (e.g., at an initial packet send) and this counter may be used to calculate the times discussed above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of routing a packet in a network comprising:
   receiving the packet and an associated time code at a first destination;
   determining if the first destination is a final destination of the packet;
   adding the packet to a buffer in response to a determination that the first destination is not the final destination of the packet;
   determining a time until final delivery based on a difference between an elapsed time since the packet was initially sent from a source and a time at which the packet is expected to be received at the final destination;
   extracting the packet from the buffer based on the time until final delivery; and
   forwarding the packet and the associated time code to a second destination based on the time until final delivery, wherein the elapsed time is based on a counter associated with the packet, the counter started when the packet is initially sent.

2. The method of claim 1 wherein determining a time until final delivery further comprises:
   determining the elapsed time since the packet was initially sent from the source.

3. The method of claim 2 further comprising:
   determining a time the packet was initially sent from the source;
   determining a current time; and
   determining a difference between the elapsed time since the packet was initially sent from the source and the time at which the packet is expected to be received at the final destination.

4. The method of claim 1 further comprising:
   forwarding the packet and the associated time code to the second destination in response to determining that the first destination is not the final destination of the packet.

5. A system for facsimile transcoding comprising:
   a processor configured to:
      receive a packet and an associated time code at a first destination;
      determine if the first destination is a final destination of the packet;
      add the packet to a buffer in response to a determination that the first destination is not the final destination of the packet;
      determine a time until final delivery based on a difference between an elapsed time since the packet was initially sent from a source and a time at which the packet is expected to be received at the final destination;
      extract the packet from the buffer based on the time until final delivery; and
      forward the packet and the associated time code to a second destination based on the time until final delivery, wherein the elapsed time is based on a counter associated with the packet, the counter started when the packet is initially sent.

6. The system of claim 5, the processor further configured to:
   determine the elapsed time since the packet was initially sent from the source.

7. The system of claim 6, the processor further configured to:
   determine a time the packet was initially sent from the source;
   determine a current time; and
   determine a difference between the elapsed time since the packet was initially sent from the source and the time at which the packet is expected to be received at the final destination.

8. The system of claim 5, the processor further configured to:
   forward the packet and the associated time code to the second destination in response to determining that the first destination is not the final destination of the packet.

9. A non-transitory computer readable medium storing computer program instructions for routing a packet in a network, which, when executed on a processor, cause the processor to perform a method comprising:
   receiving a packet and an associated time code at a first destination;
   determining if the first destination is a final destination of the packet;
   adding the packet to a buffer in response to a determination that the first destination is not a final destination of the packet;
   determining a time until delivery based on a difference between an elapsed time since the packet was initially sent from a source and a time at which the packet is expected to be received at the final destination;
   extracting the packet from the buffer based on the time until final delivery; and
   forwarding the packet and the associated time code to a second destination based on the time until final delivery, wherein elapsed time is based on a counter associated with the packet, the counter started when the packet is initially sent.

10. The computer readable medium of claim 9 wherein the method further comprises:
    determining the elapsed time since the packet was initially sent from the source.

11. The computer readable medium of claim 10 wherein the method further comprises:
    determining a time the packet was initially sent from the source;
    determining a current time; and
    determining a difference between the elapsed time since the packet was initially sent from the source and the time at which the packet is expected to be received at the final destination.

12. The computer readable medium of claim 9 wherein the method further comprises:
    forwarding the packet and the associated time code to the second destination in response to determining that the first destination is not the final destination of the packet.

* * * * *